Oct. 8, 1935.   G. CARLSON   2,016,985
LETTERING GUIDE
Filed May 24, 1935
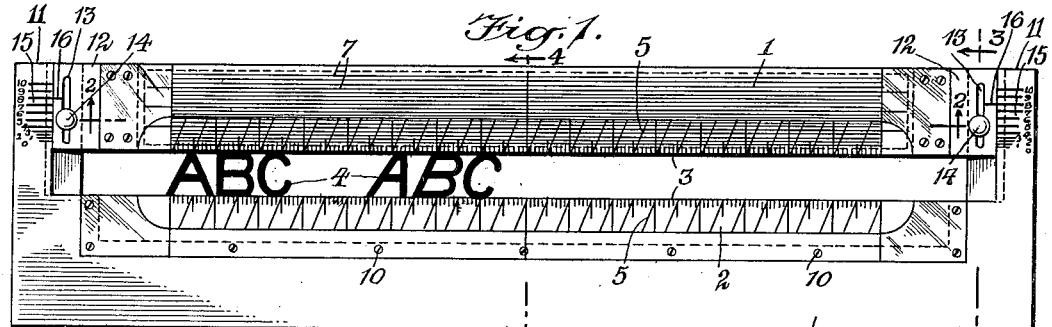
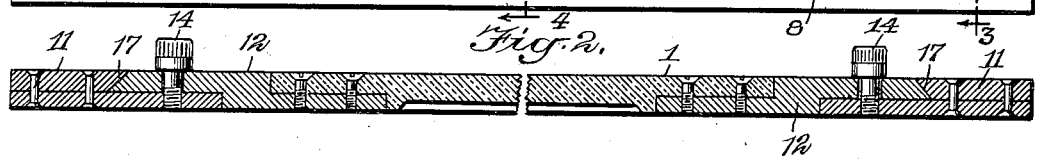
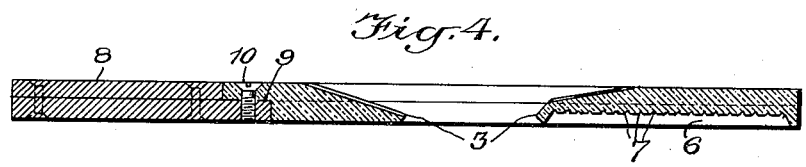
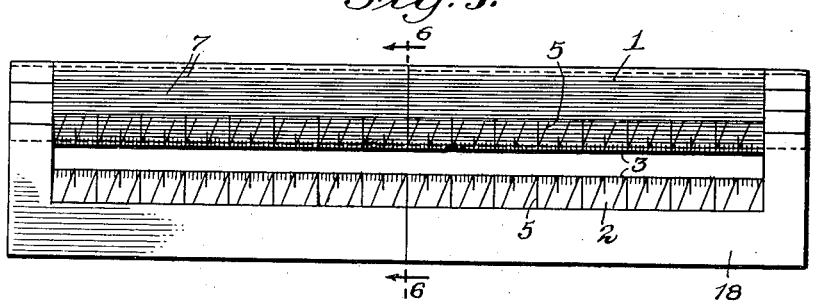
WITNESSES
INVENTOR
Gustaf Carlson
BY
ATTORNEYS Patented Oct. 8, 1935

2,016,985

UNITED STATES PATENT OFFICE 2,016,985

LETTERING GUIDE

Gustaf Carlson, Sayville, Long Island, N. Y.

Application May 24, 1935, Serial No. 23,322

3 Claims. (Cl. 33—110)

This invention relates to lettering guides, an object of the invention being to provide a guide which permits letters or characters of any form to be made free-hand and insures uniformity of height of the letters and characters, uniformity in inclination or vertical, and uniformity in spacing between the lines of letters or characters.

A further object is to provide a device of this character with which any type of pen or pencil may be used which will preclude the possibility of smearing or smudging lines of characters as the device is moved from one line to another, and which permits of adjustment to allow characters of any height to be formed.

A further object is to provide a device of this character in which the majority of portions thereof are transparent and may be made of celluloid or other suitable material so that the user may observe the previously formed characters or letters and insure a proper spacing.

A further object is to provide a device of this character which may be used in connection with a T-square and slide readily along the edge of the same or may be used alone and at any angle.

With these and other objects in view, the invention consists in certain novel features of constructions and combinations and arrangements of parts, all of which will be more fully hereinafter described and pointed out in the claims.

In the accompanying drawing:—

Figure 1 is a plan view illustrating a preferred form of my improved lettering guide;

Figure 2 is a broken view on an enlarged scale in longitudinal section on the line 2, 2 of Figure 1;

Figure 3 is an enlarged view in transverse section on the line 3, 3 of Figure 1;

Figure 4 is an enlarged view in transverse section on the line 4, 4 of Figure 1;

Figure 5 is a plan view illustrating a modification;

Figure 6 is a view in transverse section on the line 6, 6 of Figure 5.

My improved lettering guide includes an upper bar 1 and a lower bar 2, said bars both being preferably of transparent material and having straight edges 3 to form between them a space for letters or characters as indicated at 4. These bars 1 and 2 at their straight edges are formed with scales 5 which indicate linear measurements and also verticals and angles or inclinations to guide the user in the formation of letters or characters on a sheet below the device and between the straight edges. These bars 1 and 2 at their straight edges are beveled or tapered to give a sharp edge for contact with the pen or pencil used to form the letters or characters and the upper bar 1 is recessed as shown at 6 so that when one line of letters or characters has been formed and the device is moved downwardly a distance of one line the freshly inked line will lie within the chamber or compartment under the recessed portion 6 of the bar 1 so that there will be no danger of smearing or smudging the freshly inked line of characters. Furthermore, this upper bar 1 is provided with a series of equally spaced lines extending longitudinally thereof and these lines are preferably formed on the underface of the transparent bar 1 as indicated by the exaggerated showing in Figure 4 of the drawing; in other words, it is desirable to have the lines as close to the drawing paper as possible and hence it is believed desirable to have these lines on the underface of bar 1 and there indicated in the exaggerated form of the reference character 7. These lines registering with lines of letters or characters made on the sheet give to the user a visual registration so that he may accurately space the new line of letters or characters with relation to lines of letters or characters previously made, and thus there will be uniformity in the lines of letters or characters throughout.

In the preferred embodiment of my invention illustrated in Figures 1, 2, 3, and 4, of the drawing, the lower bar 2 is secured within a metal frame 8 and the edges and ends of this bar are preferably rabbeted, engaging correspondingly rabbeted edges of the frame as indicated at 9 and may be secured by screws 10. This bar 2 has a fixed relation to the frame and the bar 1 has an adjustable relation to the frame as will be now described.

The frame 8 at its ends is formed with upwardly projecting extensions 11 and plates 12 are mounted to slide on these extensions and have slots 13 therein with headed adjusting screws 14 projected through the slots and screwed into the extensions to secure the upper bar 1 at any adjustment. A suitable scale or series of lines 15 is provided on the extensions 11 registering with marks 16 on the plates 12 to guide the operator in properly adjusting the bar 1 with respect to the height of the letters or characters to be formed. A preferred arrangement is to bevel or taper the edges of the plates 12 to engage in correspondingly beveled edges of the extensions 11 as shown at 17 to cause an interlocking or interengagement of the plates with the extension allowing a free vertical adjustment thereof, but preventing any possibility of lateral displacement.

While I have illustrated the several parts of the frame as being of separate members secured together, it is obvious that the frame may constitute a single integral structure. In the modification illustrated in Figures 5 and 6 of the drawing, the same reference characters have been employed to indicate like parts throughout, but in this modified form the bars 1 and 2 are not adjustable but have a fixed relation to each other and are secured or have a fixed relation in a frame 18. In other words, the entire device shown in Figure 5 may be molded or otherwise formed into a single integral structure with the understanding that a set of these devices may be supplied having various spacing between their straight edges.

While I have illustrated and described what I believe to be a preferred embodiment of my invention, it is obvious that various changes might be made in the general form and arrangement of parts without departing from my invention, and hence I do not limit myself to the precise details set forth but consider myself at liberty to make such changes and alterations as fairly fall within the spirit and scope of the appended claims.

I claim:

1. A lettering guide including a pair of parallel spaced transparent bars having scales at their adjacent straight edges, the upper of said bars undercut or recessed in its lower face and containing parallel lines extending substantially throughout the length thereof.

2. A lettering guide comprising a frame, a lower transparent bar fixed in the frame, an upper transparent bar adjustable in the frame and parallel to the lower bar, scales on the frame registering with marks at the ends of the upper bar and parallel lines extending longitudinally of the upper bar.

3. A lettering guide comprising a frame having upward extensions at its ends, a lower transparent bar secured in the frame, an upper transparent bar, plates secured to the ends of the upper bar and at their ends having interlocked engagement with the frame extensions and capable of adjustment in said extensions, said plates having transverse slots therein and clamping screws projecting through the slots and engaging in the extensions.

GUSTAF CARLSON.